United States Patent
Kim et al.

(10) Patent No.: US 9,791,937 B2
(45) Date of Patent: *Oct. 17, 2017

(54) WEARABLE DEVICE AND METHOD FOR CONTROLLING DISPLAY OF THE SAME

(71) Applicant: LG ELECTRONICS INC., Seoul (KR)

(72) Inventors: Yongsin Kim, Seoul (KR); Doyoung Lee, Seoul (KR); Hyorim Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/225,599

(22) Filed: Aug. 1, 2016

(65) Prior Publication Data

US 2016/0342220 A1 Nov. 24, 2016

Related U.S. Application Data

(63) Continuation of application No. 14/156,123, filed on Jan. 15, 2014, now Pat. No. 9,429,755.

(30) Foreign Application Priority Data

Nov. 29, 2013 (KR) .................. 10-2013-0147481

(51) Int. Cl.
*G06F 3/01* (2006.01)
*H04N 13/04* (2006.01)
(Continued)

(52) U.S. Cl.
CPC .......... *G06F 3/017* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS

| 7,532,253 | B1 | 5/2009 | Greenberg |
| 8,842,169 | B2* | 9/2014 | Choi ................. H04N 13/0438 345/502 |

(Continued)

FOREIGN PATENT DOCUMENTS

| EP | 2611177 A2 | 1/2013 |
| EP | 2611179 A1 | 7/2013 |

(Continued)

*Primary Examiner* — Dismery Mercedes
(74) *Attorney, Agent, or Firm* — Birch, Stewart, Kolasch & Birch, LLP

(57) ABSTRACT

A method for controlling a wearable device including a display, the method including changing a content currently displayed on an external device from a first content to a second content different from the first content; determining, via a controller, whether the changing the content is performed by a wearer of the wearable device; and displaying the first content on the display of the wearable device to be viewed by the wearer if it is determined that the changing the content is performed by a person other than the wearer of the wearable device, further during the displaying the first content on the display, the first content is displayed only on the display of the wearable device.

19 Claims, 12 Drawing Sheets

(51) Int. Cl.
  *G02B 27/01* (2006.01)
  *G06F 1/16* (2006.01)
  *G06F 3/00* (2006.01)
  *G06F 3/0482* (2013.01)
  *G06F 3/0484* (2013.01)
  *G06F 3/14* (2006.01)

(52) U.S. Cl.
  CPC ......... *G02B 27/0179* (2013.01); *G06F 1/163* (2013.01); *G06F 3/005* (2013.01); *G06F 3/013* (2013.01); *G06F 3/0482* (2013.01); *G06F 3/0484* (2013.01); *G06F 3/14* (2013.01); *H04N 13/04* (2013.01); *H04N 13/044* (2013.01); *H04N 13/0429* (2013.01); *G02B 2027/014* (2013.01); *G02B 2027/0141* (2013.01); *G02B 2027/0178* (2013.01); *G02B 2027/0187* (2013.01); *H04N 13/0431* (2013.01); *H04N 13/0447* (2013.01)

(56) References Cited

U.S. PATENT DOCUMENTS

| | | | | |
|---|---|---|---|---|
| 8,854,531 | B2* | 10/2014 | Karaoguz | H04N 13/0404 348/348 |
| 8,866,892 | B2* | 10/2014 | Kim | H04N 13/0438 348/55 |
| 8,983,539 | B1 | 3/2015 | Kim et al. | |
| 9,036,847 | B2* | 5/2015 | Han | H04R 1/105 348/55 |
| 2004/0257337 | A1* | 12/2004 | Shibamiya | H04N 5/4403 345/156 |
| 2006/0028429 | A1 | 2/2006 | Kanevsky et al. | |
| 2006/0082542 | A1* | 4/2006 | Morita | A61B 5/7475 345/156 |
| 2006/0255963 | A1 | 11/2006 | Thompson et al. | |
| 2010/0277485 | A1* | 11/2010 | Zalewski | H04N 13/0431 345/502 |
| 2011/0159929 | A1 | 6/2011 | Karaoguz et al. | |
| 2011/0254829 | A1* | 10/2011 | Agevik | H04N 13/0402 345/213 |
| 2012/0249741 | A1 | 10/2012 | Maciocci et al. | |
| 2013/0009746 | A1 | 1/2013 | Ryu | |
| 2013/0040623 | A1 | 2/2013 | Chun et al. | |
| 2013/0169765 | A1* | 7/2013 | Park | H04N 13/04 348/54 |
| 2013/0169772 | A1 | 7/2013 | Kim et al. | |
| 2014/0036044 | A1 | 2/2014 | Choi et al. | |
| 2014/0055348 | A1* | 2/2014 | Sudo | G06F 3/0481 345/156 |
| 2014/0132410 | A1 | 5/2014 | Chang | |
| 2014/0362201 | A1 | 12/2014 | Nguyen et al. | |
| 2015/0067580 | A1 | 3/2015 | Um et al. | |
| 2015/0130355 | A1* | 5/2015 | Rains, Jr. | H05B 37/0227 315/134 |

FOREIGN PATENT DOCUMENTS

| | | |
|---|---|---|
| KR | 10-2013-0004852 A | 1/2013 |
| KR | 10-1310941 B1 | 9/2013 |

\* cited by examiner

FIG. 1A
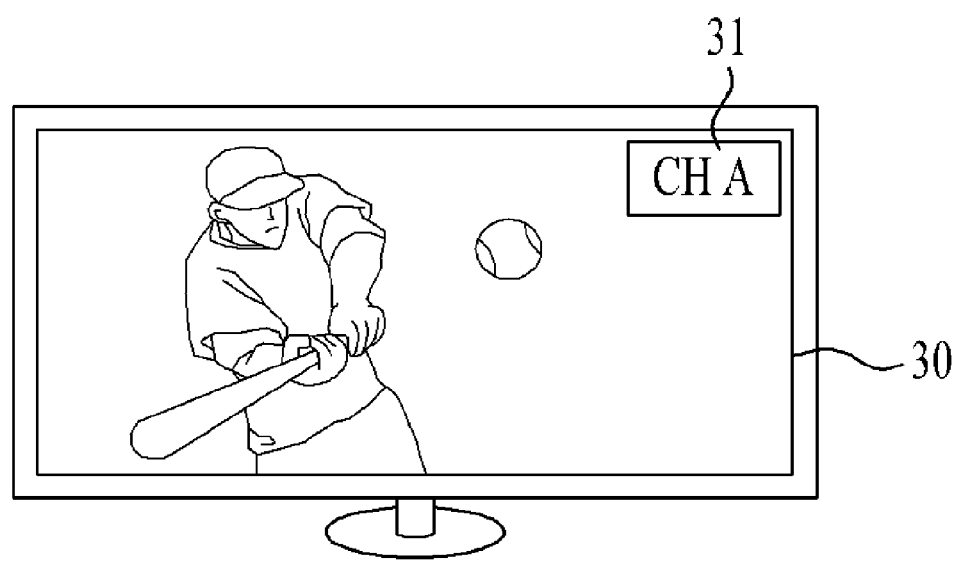
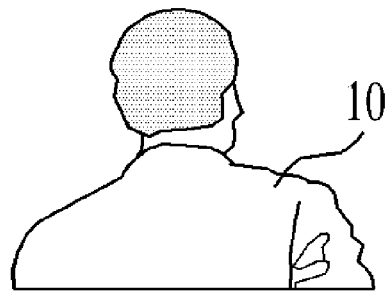
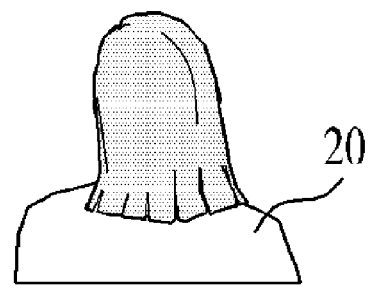

FIG. 3A
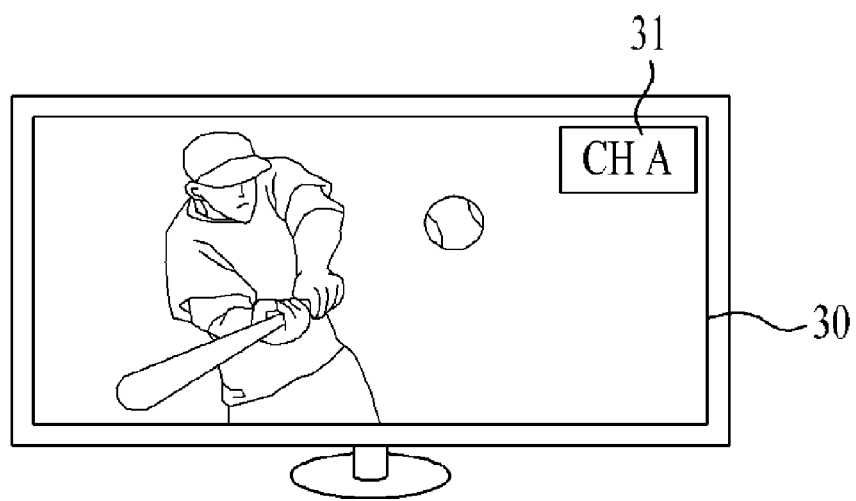
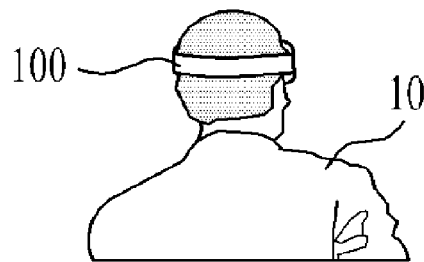
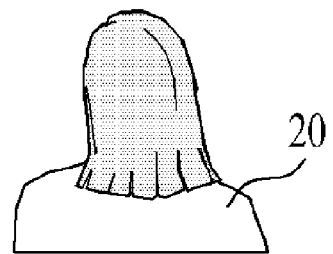

FIG. 4A
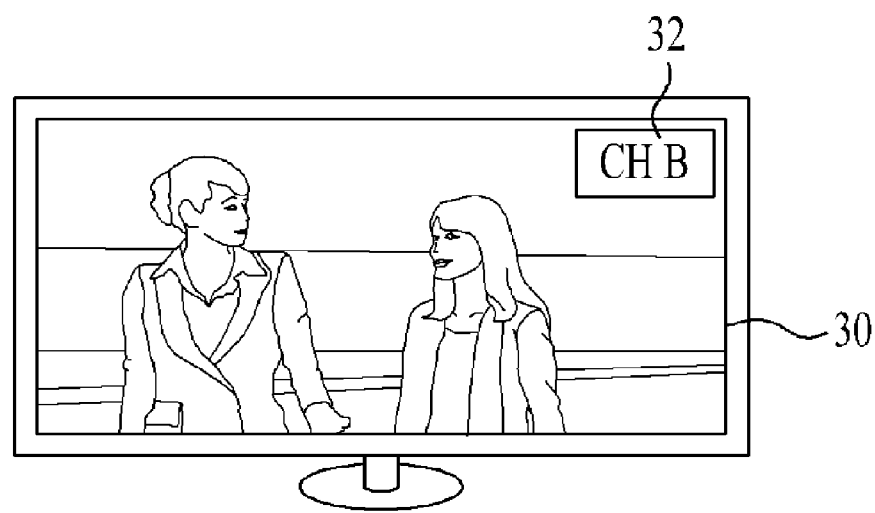
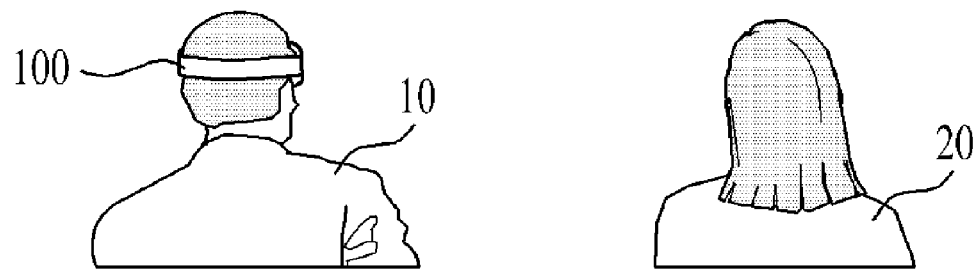

WEARABLE DEVICE AND METHOD FOR CONTROLLING DISPLAY OF THE SAME

This application is a Continuation of copending U.S. application Ser. No. 14/156,123, filed on Jan. 15, 2014, which claims priority under 35 U.S.C. §119 (a) to Application No. 10-2013-0147481, filed in the Republic of Korea on Nov. 29, 2013 all of which are hereby expressly incorporated by reference into the present application.

BACKGROUND OF THE INVENTION

Field of the Invention

The present invention relates to a wearable device. And, most particularly, the present invention relates to a method for controlling a wearable device, so that information desired by a user can be displayed on the wearable device.

Discussion of the Related Art

With the recent trend in digital devices becoming more light-weight and more compact in size, diverse types of wearable devices are being researched and developed. Herein, a wearable device collectively refers to all types of digital devices that can be worn on a user's head, arm, eye, and so on, so as to provide diverse information to the user. For example, diverse types of wearable devices using diverse methods, such as a 'Smart Glass' type (e.g., Head Mount Display (HMD), G-Glass, and so on) being worn on the head, a 'Smart Watch' type being worn on the arm, a 'Smart Lens' type being inserted in the eyes just as contact lenses, are being researched and developed.

Additionally, most of the wearable devices are provided with a display means on one side of the wearable device, so as to provide diverse information to the user, as described above. For example, the display means may be capable of conveniently providing the user with wanted (or desired) information by being configured of a combination of Augmented Reality (AR), N-screen technology, and so on. Respectively, an object of the present invention is to allow the user to use the diverse types of wearable devices so as to be provided with more significant information.

SUMMARY OF THE INVENTION

Accordingly, the present invention is directed to a wearable device and a method for controlling display of the same that substantially obviate one or more problems due to limitations and disadvantages of the related art.

An object of the present invention is to provide a wearable device and a method for controlling display of the same that can provide a user with significant information by using a display means of the wearable device.

Another object of the present invention is to provide a wearable device and a method for controlling display of the same that can recognize motions and gestures of a user wearing the wearable device, so as to provide adequate information respective to the recognized motions and gestures.

Yet another object of the present invention is to provide a wearable device and a method for controlling display of the same that can automatically recognize channel or contents information, which is wanted (or desired) by a user wearing the wearable device, so as to provide the automatically recognized information to the corresponding user.

Yet another object of the present invention is to provide a wearable device and a method for controlling display of the same that can determine intentions of the user wearing the wearable device, when a change in the channel or contents occurs, while multiple users are commonly viewing a specific channel or contents through an external display, so as to use the determined intentions of the corresponding user for controlling the display.

Yet another object of the present invention is to provide a wearable device and a method for controlling display of the same that can continue to display the same previous channel or contents to the user wearing the wearable device, when a third party attempts to change the channel or contents instead of the user wearing the wearable display device, while multiple users are commonly viewing a specific channel or contents through an external display.

Yet another object of the present invention is to provide a wearable device and a method for controlling display of the same that can provide the user wearing the wearable device with user-selectable menu information, when a third party attempts to change the channel or contents instead of the user wearing the wearable device, while multiple users are commonly viewing a specific channel or contents through an external display, so that the corresponding user can select whether or not to display the same previous channel or contents.

A further object of the present invention is to provide a wearable device and a method for controlling display of the same that meet with at least one of the above-described technical objects of the present invention.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

For simplicity in the description of the present invention, the terms 'channel' and 'contents' will be collectively referred to as 'channel'. Therefore, it should be noted that the term 'channel', which is used in the following detailed description of the present invention and in the appended drawings, will be equally applied as a 'contents' unit as well as a 'channel' unit.

To achieve these objects and other advantages and in accordance with the purpose of the invention, as embodied and broadly described herein, in a method for controlling display of a wearable device, the wearable device being equipped with a display means, the method for controlling the wearable device includes the steps of, when a contents change in information currently being viewed through an external device occurs, determining whether or not the contents change corresponds to a change performed by a wearer of the wearable device, and, when it is determined that the contents change corresponds to a change performed by a viewer other than the wearer of the wearable device, displaying a content signal that was previously viewed prior to the contents change to the display means.

Additionally, the step of determining whether or not the contents change corresponds to a change performed by a wearer of the wearable device may include the steps of detecting a specific motion or gesture of the wearer of the wearable device, after detecting the specific motion or gesture, verifying whether or not a contents change signal is received, and, based upon the verified result, when the contents change signal is received after detecting the specific motion or gesture of the wearer of the wearable device, determining the respective contents change as a contents change performed by the wearer of the wearable device.

Additionally, in order to determine the received contents change as a contents change performed by the wearer of the wearable device, a movement in a body and an arm of the wearer of the wearable device may be detected to be equal to or greater than a predetermined size at least before the contents change signal is received.

Additionally, the method for controlling display of the wearable device, further includes, when wireless communication is set up with the external device, receiving contents information currently being displayed on the external device and storing the received contents information.

Additionally, the method for controlling display of the wearable device, further includes, when it is determined that the contents change corresponds to a change performed by a viewer other than the wearer of the wearable device, using the stored contents information, so as to request for contents corresponding to the stored contents information from the external device.

Meanwhile, according to another aspect of the present invention, a wearable device includes a communication unit configured to be capable of performing communication with an external device, a display means configured to be capable of displaying a signal received from the external device, and a controller configured to perform control operations so that a content signal viewed prior to contents change can be displayed on the display means of the wearable device, when a contents change in information currently being viewed through an external device occurs, and when it is determined that the contents change does not correspond to a change performed by a wearer of the wearable device.

Additionally, the wearable device further includes a sensor unit configured to detect a motion or gesture of the wearer of the wearable device.

Additionally, in order to determine whether or not the contents change corresponds to a change performed by a wearer of the wearable device, the controller may be configured to analyze a specific motion or gesture of the wearer of the wearable device, the specific motion of gesture being detected by the sensor unit, and, only when a contents change signal is received after detecting the specific motion or gesture, determining the respective contents change as a contents change performed by the wearer of the wearable device.

Additionally, in order to determine the received contents change as a contents change performed by the wearer of the wearable device, a movement in a body and an arm of the wearer of the wearable device may be detected to be equal to or greater than a predetermined size at least before the contents change signal is received.

Additionally, the wearable device further includes a storage unit configured to receive contents information currently being displayed on the external device and to store the received contents information, when wireless communication is set up with the external device.

Additionally, when it is determined that the contents change corresponds to a change performed by a viewer other than the wearer of the wearable device, the controller may further be configured to perform a process of requesting for contents corresponding to the stored contents information from the external device by using the stored contents information stored in the storage unit.

Additionally, the wearable device may correspond to any one of a smart glass type device, a smart watch type device, and a smart lens type device.

According to a further aspect of the present invention, in a method for controlling display of a wearable device, the wearable device being equipped with a display means, the method for controlling the wearable device includes the steps of, when a contents change in information currently being viewed through an external device occurs, receiving contents change information from the external device, with respect to the received contents change information, providing the display means with user interaction inquiring on whether or not to receive a previous contents signal prior to the contents change, with respect to the user interaction, identifying a user command requesting for the previous contents signal to be received, and, with respect to the user command, receiving the previous contents signal from an external source, and displaying the received previous contents signal on the display means of the wearable device.

Additionally, the method for controlling display of the wearable device further includes verifying whether or not the contents change is performed by the wearer of the wearable device, wherein the user interaction may be provided only when it is determined through the verification step that the contents change is performed by a viewer other than the wearer of the wearable device.

Additionally, the step of verifying whether or not the contents change is performed by the wearer of the wearable device may include the steps of analyzing a specific motion or gesture of the wearer of the wearable device, and, when the contents change signal is received after analyzing the specific motion or gesture of the wearer of the wearable device, determining the respective contents change as a contents change performed by the wearer of the wearable device.

Additionally, in order to determine the received contents change as a contents change performed by the wearer of the wearable device, a movement in a body and an arm of the wearer of the wearable device may be detected to be equal to or greater than a predetermined size at least before the contents change signal is received.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1a to FIG. 1b illustrate the background art technology in order to facilitate the understanding of the present invention;

FIG. 3a to FIG. 3b and FIG. 4a to FIG. 4b respectively illustrate the concept being applied to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Although the terms used in the description of the present invention are selected from generally known and used terms, considering the abilities of the present invention, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood, not simply by the actual terms used but by the meaning of each term lying within. Most particularly, it should be noted that the term 'wearable device', which is used in the present invention, is used to collectively refer to all types of devices that can be detachably fixed to part of the user's body, rather than merely indicating the specific product itself. Therefore, in order to facilitate the understanding of the present invention, even if a portion of the description of the present invention is based upon one specific type (e.g., a smart glass type), among the various types of 'wearable devices', with the exception for the specific operations or functions of the corresponding wearable device type, it should be understood that all concepts of the present invention are to be equally applicable to all types of wearable devices. Hereinafter, in order to describe the preset invention, although the smart glass type will be given as an example of the wearable device, it will be apparent that the content of the present invention can also be equally applied to the smart watch type and the smart lens type. Furthermore, as described above, it should be understood that the term 'channel', which is used in the description of the present invention, has been used to include 'channel' units of a specific broadcast channel as well as 'contents' units, which are differentiated for each set of contents.

Figure 1B:
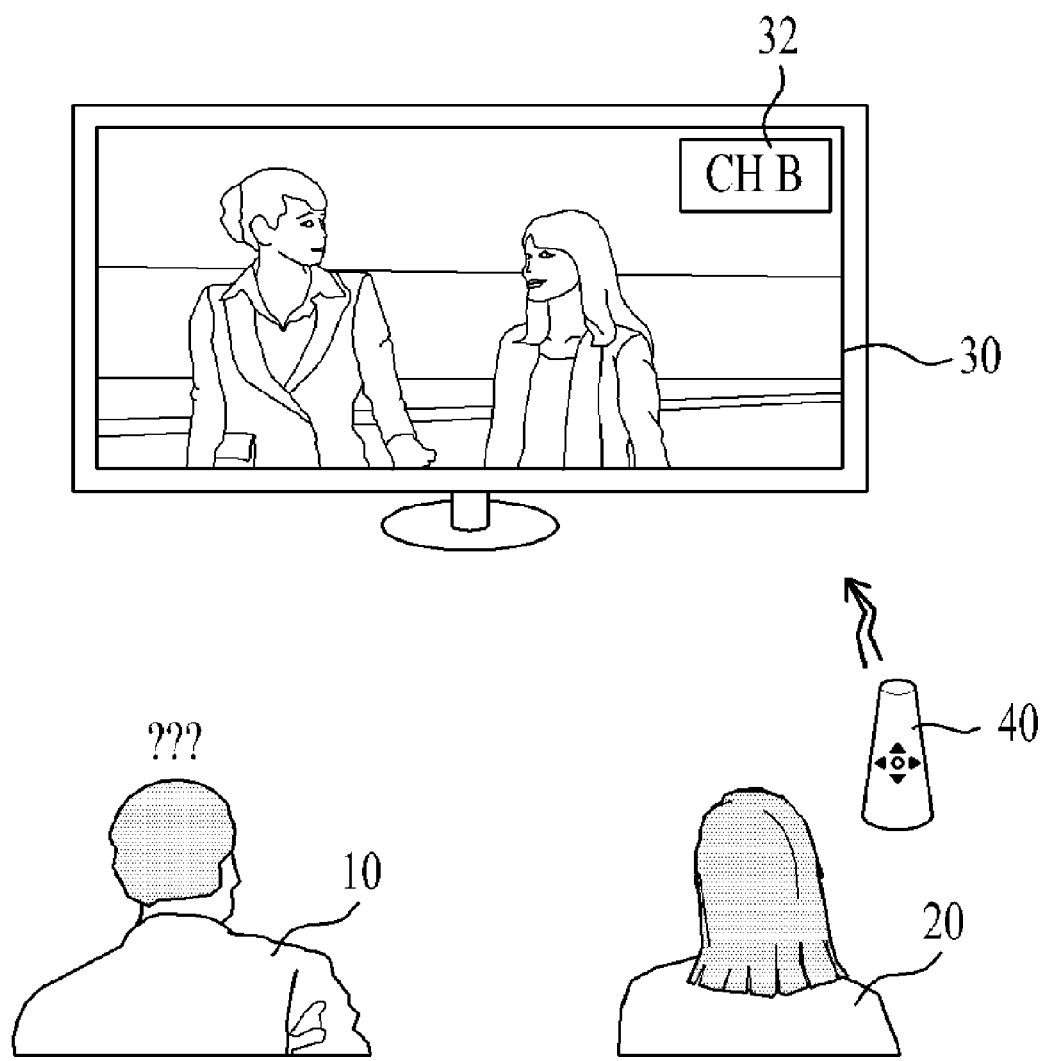

FIG. 1a to FIG. 1b illustrate the background art technology in order to facilitate the understanding of the present invention. FIG. 1a illustrates an exemplary case when it is assumed that multiple viewers (e.g., Viewer A 10 and Viewer B 20) are viewing specific channel information 31 (e.g., Channel A (CH A)) through a main display or an external device 30 (e.g., television (TV)) in a general household or a public facility or place. FIG. 1b illustrates an exemplary case when it is assumed, in the situation shown in FIG. 1a, that viewer B 20 changes the viewing channel from the current Channel A 31, which is being viewed through an external display device, to another channel B 32 by using a remote controller 40 or another means. Accordingly, even if Viewer A 10 is still willing to view the previous channel A, Viewer A 10 may be forced to stop viewing Channel A, which Viewer A 10 wishes to view, and may be forced to view a channel he (or she) does not wish to view (e.g., Channel B).

For example, in case Viewer A 10 is a male viewer, and in case Viewer B 20 is a female viewer, preferred channel information of each viewer may differ from one another, such as Sports (Channel A) and Drama (or TV series) (Channel B). Moreover, for example, in case Viewer A 10 is a parent viewer, and in case Viewer B is a child viewer, the preferred channel information of each viewer may differ from one another. As described above, it will be apparent that, when multiple viewers are commonly viewing a specific channel through a common main display device 30, and when the viewing channel is changed by a specific viewer without the consent of one or more other viewers, the channel information of the previous channel is required to be continuously provided to the other viewers, who have not agreed with the change in the viewing channel. The present invention intends to realize such requirements by using the above-described wearable device.

Figure 2:
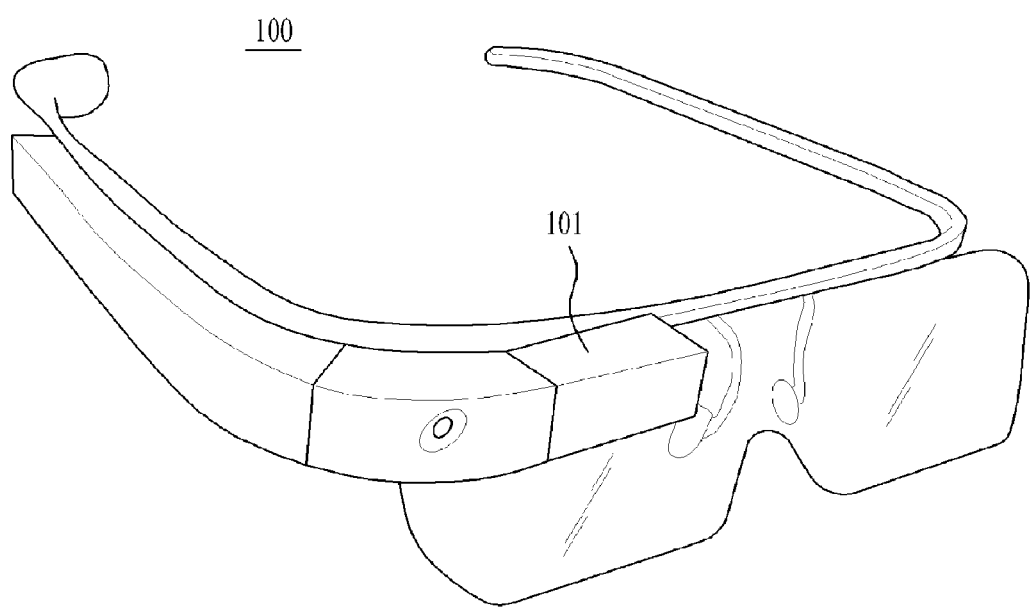
FIG. 2 illustrates referential view showing external features of a smart glass as an exemplary embodiment of a wearable device according that can be applied to the present invention.

FIG. 2 illustrates referential view showing external features of a smart glass as an exemplary embodiment of a wearable device according that can be applied to the present invention. As described above, the present invention will hereinafter be described by giving a smart glass 100 as an example of the wearable device according to the present invention. However, the details of the present invention may be identically applied to other wearable devices.

FIG. 2 corresponds to an exemplary model of a smart glass, which is currently most widely known. Herein, although its exterior (or outside) features are similar to a general pair of glasses, the smart glass is equipped with a display means 101, which operates on an optical effect and electrical signals, on one side of the smart glass. Since the structure (or configuration) and operation principles of the display means 101 are identical to those of the related art method, detailed description of the same will hereinafter be omitted for simplicity. If a 'smart watch' or a 'smart lens' is being applied as an example of the wearable device according to the present invention, it will be apparent that the operating principles of the display means are different from those of the smart glass. Eventually, regardless of the type of the display means, the present invention may be equally applied to any wearable device being equipped with any type of display means.

Figure 3B:
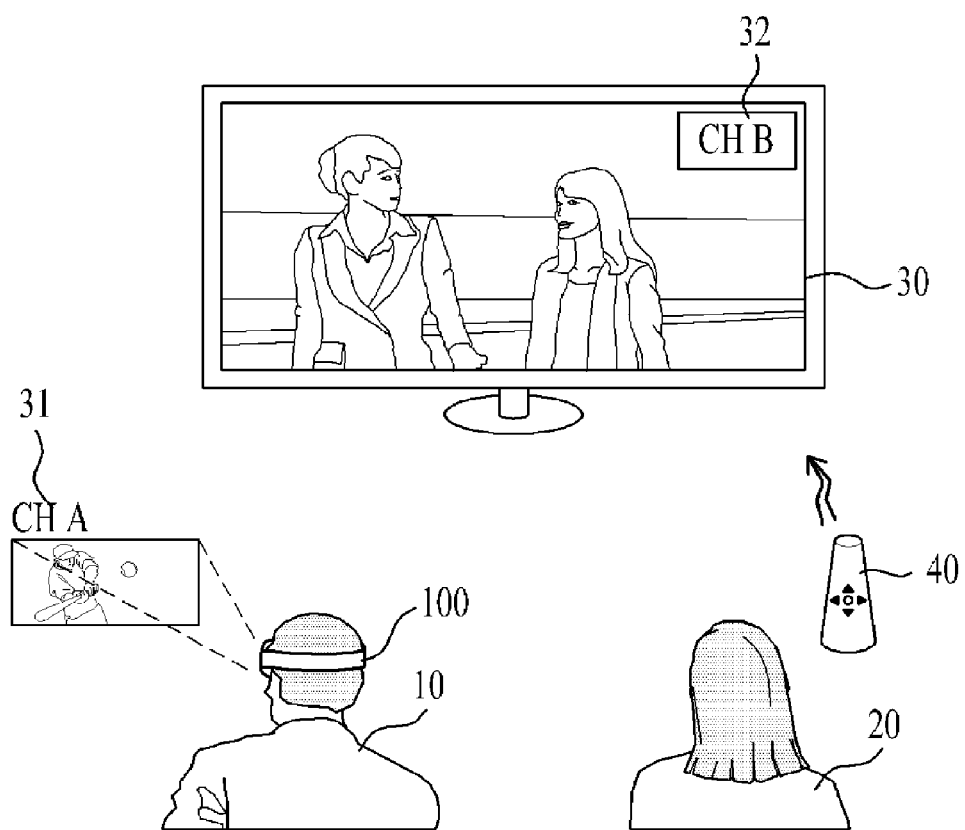

FIG. 3a to FIG. 3b and FIG. 4a to FIG. 4b respectively illustrate the concept being applied to the present invention. First of all, FIG. 3a to FIG. 3b will hereinafter be described in detail. FIG. 3a corresponds to the same assumption made in FIG. 1a, with the exception for the fact that Viewer A 10 is wearing the smart glass 100. More specifically, FIG. 3a illustrates an exemplary case when it is assumed that Viewer A 10 wearing the smart glass 100 and Viewer B 20 are viewing specific channel information 31 (e.g., Channel A (CH A)) through an external display device 30 (e.g., television (TV)) in a general household or a public facility or place. In the above-described situation, although it is shown in the example that Viewer B 20 is not wearing the smart glass 100, the exemplary embodiment shown in FIG. 3a and FIG. 3b may be realized regardless of whether or not Viewer B 20 is wearing the smart glass 100.

FIG. 3b illustrates an exemplary case when it is assumed, in the situation shown in FIG. 3a, that viewer B 20 changes the viewing channel from the Channel A 31, which is the current viewing channel of the external display device 30, to another channel B 32 by using a remote controller 40. More specifically, in the exemplary case shown in FIG. 3b, if the viewing channel of the external display device 30 is changed regardless of Viewer A's free will), who is wearing the smart glass 100, Viewer A 10 may continue to view the previously viewed channel information (i.e., Channel A information) through the display means 101 of the smart glass 100.

Figure 4B:
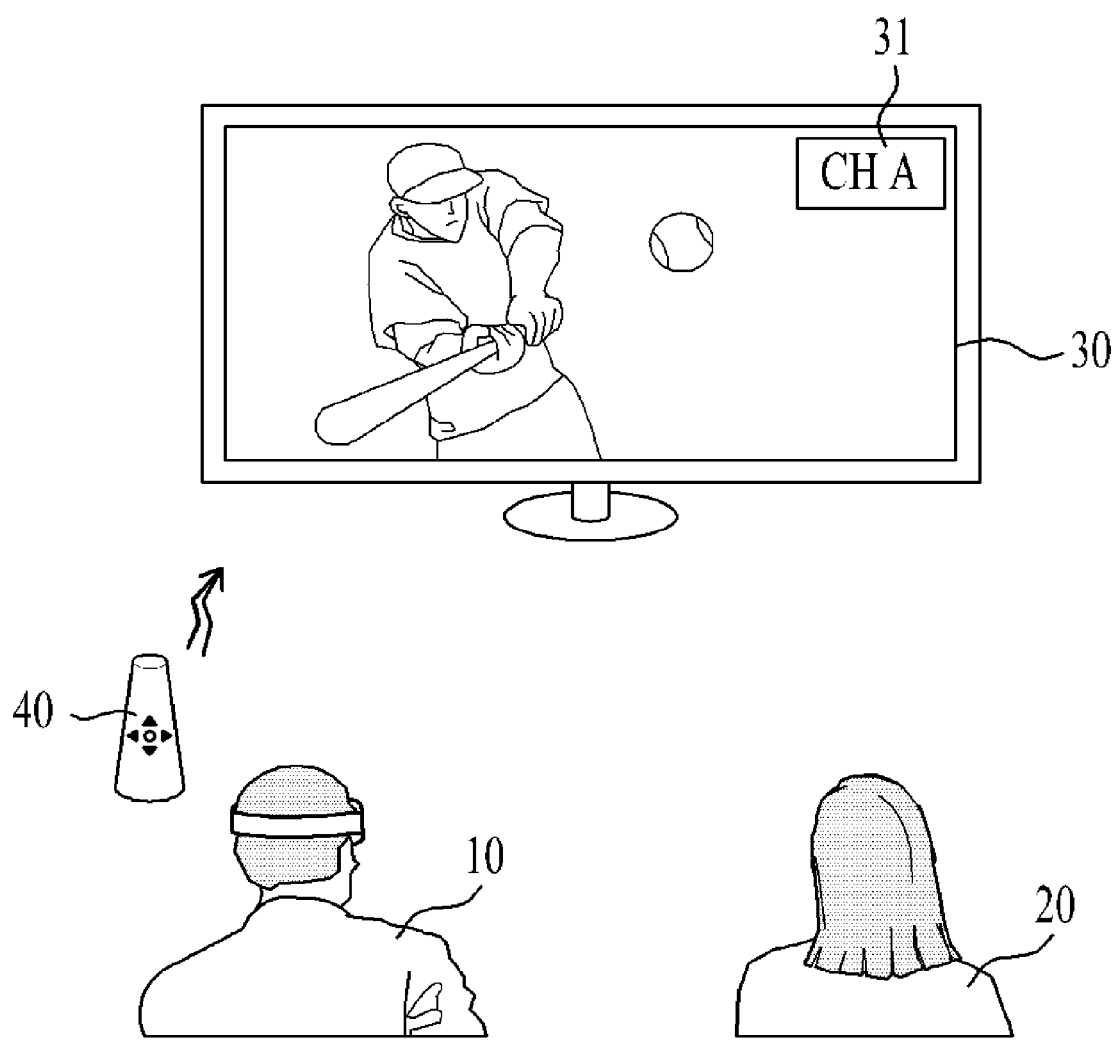

Additionally, FIG. 4a to FIG. 4b will hereinafter be described in detail. FIG. 4a illustrates a case when it is assumed that viewer A 10 wearing a smart glass 100 and viewer B20 are viewing specific channel information(32) (e.g., Channel B) through an external display device 30. And, FIG. 4b illustrates an exemplary case when it is assumed, in the situation shown in FIG. 4a, that viewer A (10), who is wearing the smart glass 100, changes the viewing channel from the Channel B 32, which is the current viewing channel of the external display device 30, to another channel A 31 by using a remote controller 40. More specifically, in the exemplary case shown in FIG. 4b, since viewer A 10 wearing the smart glass 100 has intentionally performed channel change on his (or her) own free will, the previous channel B 32 information will not be provided later on through the display means 101 of the smart glass 100. More specifically, by comparing FIG. 3b to FIG. 4b, it will eventually be apparent that the control of the display means included in the smart glass 100 may vary from one another depending upon who the channel changing subject is. For example, in case the viewer wearing the smart glass 100 has changed the channel by himself (or by herself) (e.g., FIG. 4b), the previous channel information is not displayed on the display means 101 of the smart glass 100. Conversely, in case a viewer other than the viewer wearing the smart glass 100 has changed the channel (e.g., FIG. 3b), the smart glass 100 may be controlled so that the previous channel information can be displayed on the display means 101 of the smart glass 100.

Figure 5:
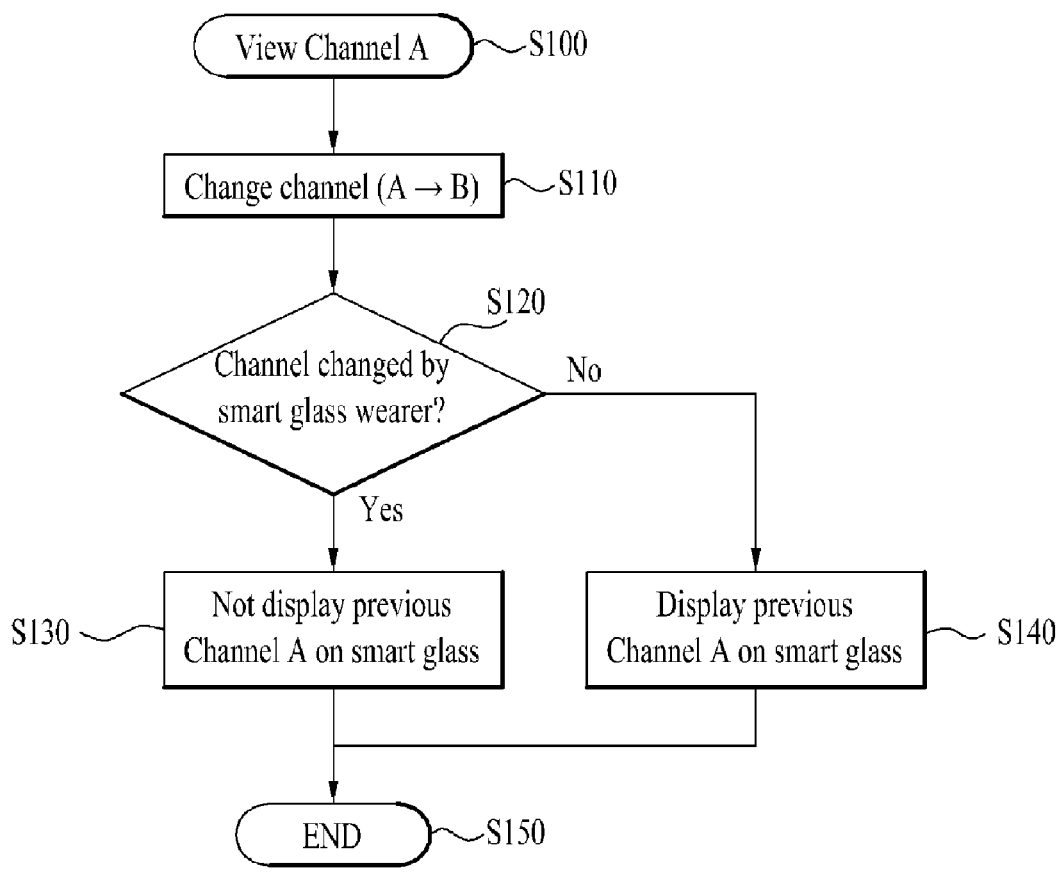
FIG. 5 illustrates a flow chart being applied to the present invention.

Hereinafter, the characteristic operations of the present invention and the detailed description of the same will be described in more detail with reference to FIG. 5 to FIG. 9. FIG. 5 illustrates a flow chart being applied to the present invention. Respectively, the flow chart of FIG. 5 relates to a method for controlling display of the smart glass 100, which is worn by the above-described viewer A 10. For example, the flow chart of FIG. 5 may be understood as an exemplary embodiment of an operation of controlling the display 101 performed by a controller 110, which is included in an internal structure of the smart glass 100 shown in FIG. 9, which will be described later on in more detail.

First of all, in a situation when channel information (e.g., Channel A) is being viewed through an external display device 30 (S100), the smart glass 100 verifies whether or not channel change has been performed (S110). The information on whether or not the channel change has been performed may be determined by a communication between the external display device 30 and the smart glass 100. For example, when a channel change occurs, the external display device 30 may transmit a channel change notification to the smart glass 100, and, after receiving the channel change notification, the smart glass 100 may verify that the current channel of the external display device 30 has been changed.

Thereafter, the controller 110 of the smart glass 100 verifies whether or not the verified channel change corresponds to a channel change performed by a user (or viewer) wearing the smart glass 100 (i.e., a wearer of the smart glass 100) (e.g., viewer A 10) (S120). If, in step S120, it is determined that the verified channel change corresponds to a result of a channel change performed by a user other than the wearer of the smart glass 100 (or the user wearing the smart glass 100) (e.g., viewer B 20), the controller 110 of the smart glass 100 controls the smart glass 100, so that the previous channel A information, which was being viewed prior to the channel change, can be displayed (S140). Conversely, in step S120, if it is determined that the verified channel change corresponds to a result of a channel change performed by the wearer of the smart glass 100 (or the user wearing the smart glass 100), the previous channel information is not displayed on the display means 101 of the smart glass 100 (S130).

Figure 6:
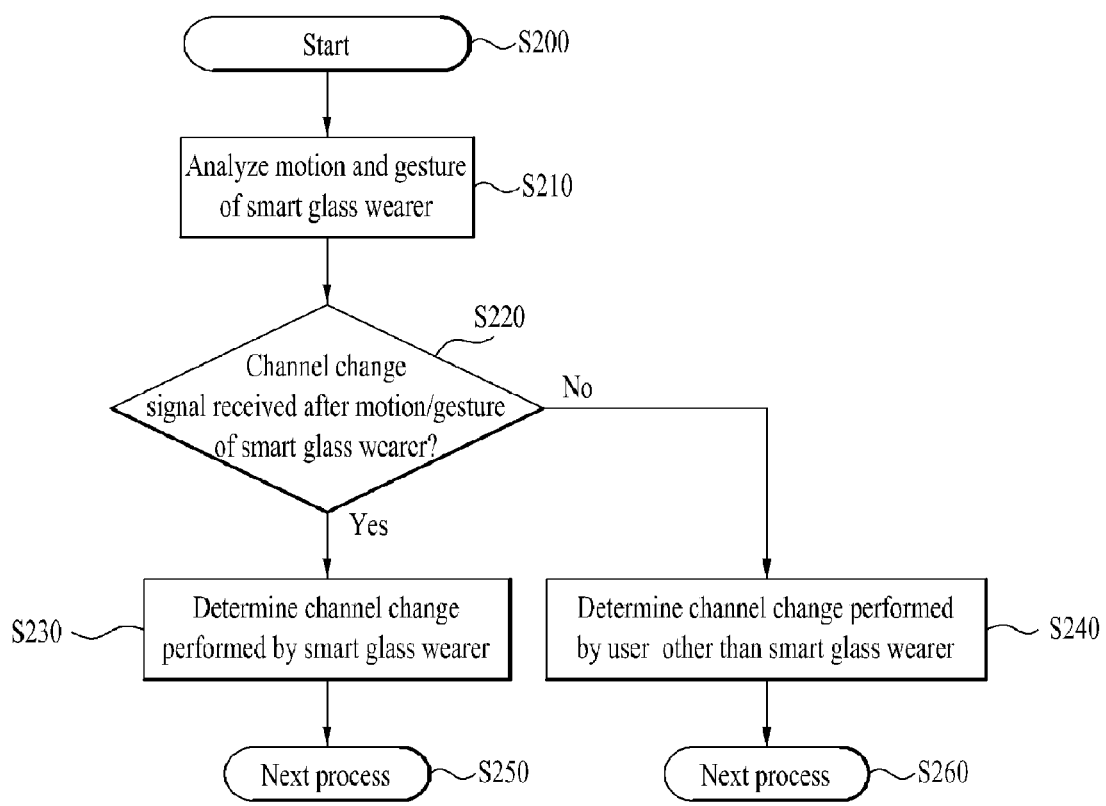
FIG. 6 illustrates a detailed flow chart being applied to the present invention.

Respectively, FIG. 6 illustrates a detailed flow chart being applied to the present invention. And, more particularly, FIG. 6 shows a detailed method of determining a subject performing the channel change in step S120. More specifically, a process of determining the subject performing the channel change (S200) first includes a step of detecting and analyzing a motion and gesture of the smart glass wearer 10 (or user 10 wearing the smart glass 100) (S210). More specifically, step S210 is performed by a sensor unit 106 and a camera 105, which are included in the internal structure of the smart glass 100 shown in FIG. 9, which will be described later on in more detail, so as to detect any motion and/or gesture performed near the smart glass 100, and, then, a movement determining unit 107 analyzes the detected motion and/or gesture, so as to determine the presence of a specific movement.

More specifically, the sensor unit 106 detects all movements performed by the smart glass wearer 10. For example, the sensor unit 106 detects whether or not the smart glass wearer 10 performs a motion of leaning an upper part of his (or her) body forward, or whether or not the smart glass wearer 10 performs a motion of grabbing a specific object (e.g., remote controller 40) by using any one of his (or her) left arm or right arm. Thereafter, when the detected motion and/or gesture of the smart glass wearer 10 is determined to be performed in a movement range greater than a predetermined movement size, or when the detected motion and/or gesture of the smart glass wearer 10 is determined to be identical to a specific operation gesture (e.g., an operation of grabbing an object), this may indicate that a movement of the smart glass wearer exists.

After step S210, for example, after the significant movement of the smart glass wearer 10, which is performed in step S210, it is determined whether or not a channel change signal is received (S220). Accordingly, after determining the presence of the significant movement in step S210, when a channel change signal is received within a predetermined short period of time (T) (S220), the controller 110 may finally determine the channel change, which is performed by the smart glass wearer 10 (S230). On the other hand, in step S210, if a channel change signal is received while the detected motion and/or gesture is not determined as the movement performed by the smart glass wearer 10, or if the channel change signal is received after a predetermined period of time, even in case the detected motion and/or gesture has been determined to be performed by the smart glass wearer 10, the controller 110 of the smart glass 100 (or smart glass controller 110) may determine that the detected channel change has been performed by another user instead of the smart glass wearer 10 (S240).

Accordingly, based upon the determined result of steps S230 and S240, the following control operations S250 and S260 may be decided. As described above in step S230, if it is determined that the channel change has been performed by the smart glass wearer 10, the smart glass controller 110 controls the smart glass 100, so that previous channel information cannot be displayed on the display means 101 of the smart glass 100 (S250). Conversely, as described above in step S240, if it is determined that the channel change has been performed by a user other than the smart glass wearer 10, the smart glass controller 110 controls the smart glass 100, so that previous channel information can be displayed on the display means 101 of the smart glass 100 (S260). Moreover, each of the steps S250 and S260 may further include a step of providing menu information available with user interaction respective to each step. And, this will be described later on in more detail.

Figure 7:
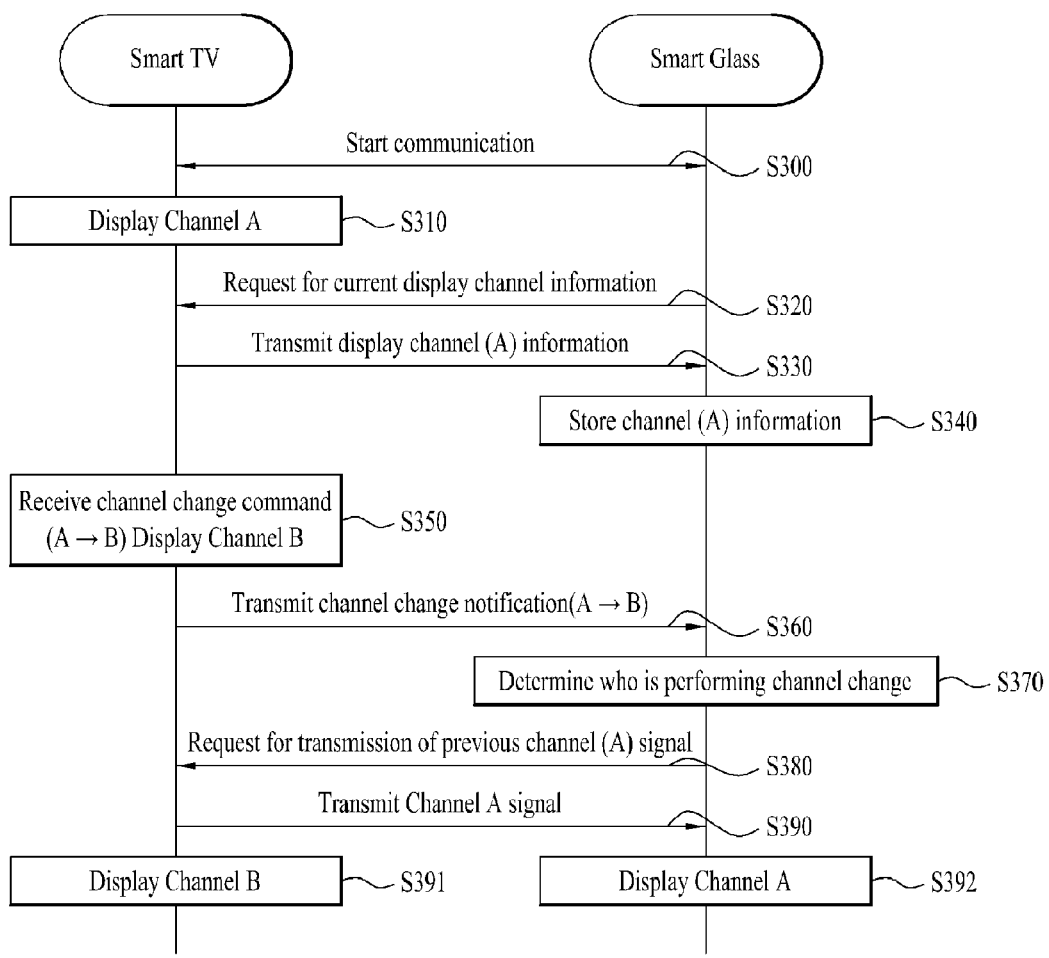
FIG. 7 illustrates a flow chart showing an interaction between an external device and a wearable device according to an exemplary embodiment being applied to the present invention.

FIG. 7 illustrates a flow chart showing an interaction between an external display device and a wearable device according to an exemplary embodiment being applied to the present invention. For example, for simplicity in the description of the present invention, the external display device will be described as a smart TV 30, and the wearable device will be described as the smart glass 100.

In a state when communication has been set up between the smart TV 30 and the smart glass 100 and when data transmission and reception between the smart TV 30 and the smart glass 100 is available (S300), the smart TV 30 may assume that the smart TV 30 is in a state of displaying channel A (S310). With respect to a signal inquiring on or requesting for the channel information that is currently being displayed, the signal being transmitted by the smart glass 100 (S320), the smart TV 30 provides the channel information (e.g., Channel A) that is currently being displayed to the smart glass 100 (S330). Thereafter, the smart glass 100 stores the received channel A information in an internal storage unit 102 (S340).

Subsequently, in case a change (e.g., a change from Channel A to Channel B) has occurred in the channel that is currently being viewed, the smart TV 30 displays the channel information corresponding to the newly changed Channel B (S350). At the same time as step S350 is being performed, the smart TV 30 notifies the change in the viewing channel to the smart glass 100 (S360). After receiving the notification on the change in the viewing channel, by performing a process of determining the subject performing the channel change, as described above with reference to FIG. 6, the controller 110 of the smart glass 100 (or the smart glass controller 110) determines whether the channel change is performed by the smart glass 100 wearer (or the user wearing the smart glass 100), or whether the channel change is performed by a user other than the smart glass 100 wearer (S370). Based upon the determined result in step S370, if it is determined that the channel change is performed by a user other than the user wearing the smart glass 100, the controller 110 of the smart glass 100 uses the previous channel information (e.g., Channel A), which has been stored in step S340, so as to request for a channel signal respective to the previous Channel A to be transmitted from the smart TV 30 (S380). After receiving the request for channel signal transmission, the smart TV 30 transmits a Channel A signal to the smart glass 100 (S390). After receiving the Channel A signal, the controller 110 of the smart glass 100 displays the received Channel A signal on the display means 101 (S392). On the other hand, the smart TV 30 continues to display the channel signal of the newly changed Channel B (S391).

Additionally, although it is not shown in the drawing, after the state of having performed steps S391 and S392, if the display channel of the smart TV 30 returns to the previous Channel A from Channel B, the smart TV 30 notifies the occurrence of the corresponding channel change to the smart glass 100. Thereafter, the controller 110 of the smart glass 100 compares the newly changed channel information with the channel information (e.g., Channel A), which is stored in the internal storage unit 102. And, if it is determined that the newly changed display channel of the smart TV 30 has returned to the previously stored Channel A, the controller 110 of the smart glass 100 may perform control operations so that the display of the Channel A signal, which is currently being performed as a result of step S392, can be stopped. Respectively, the smart glass wearer 10 may also set up and store his (or her) preferred channels in advance. Furthermore, in step S380, in order to receive the Channel A signal, instead of requesting the smart TV 30 for the Channel A signal, the smart glass 100 may also directly tune to a Channel A signal and receive the Channel A signal. However, in order to so, it will be apparent that the smart glass 100 is required to be separately provided with an antenna and tuner for receiving a broadcast channel.

Figure 8:
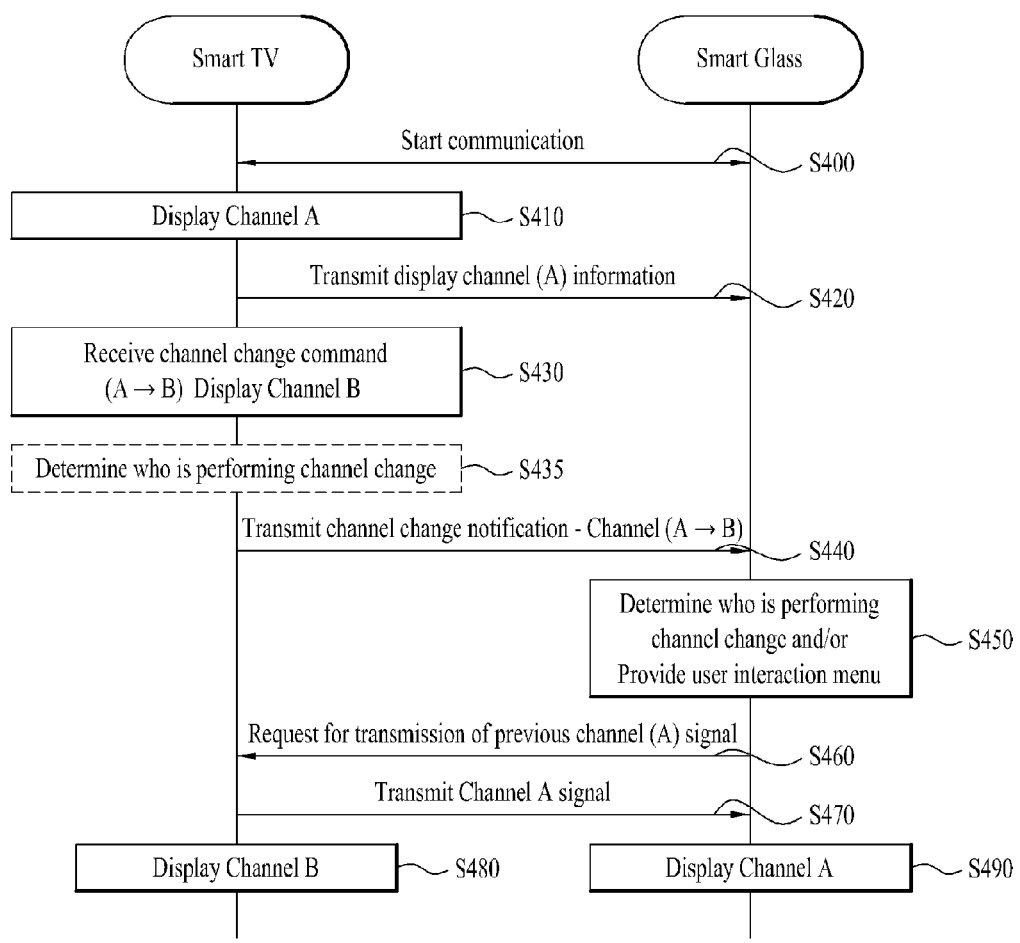
FIG. 8 illustrates a flow chart showing an interaction between an external device and a wearable device according to another exemplary embodiment being applied to the present invention.

FIG. 8 illustrates a flow chart showing an interaction between an external device and a wearable device according to another exemplary embodiment being applied to the present invention. As mentioned above with reference to FIG. 7, for simplicity in the description of the present invention, the external display device will also be described as a smart TV 30, and the wearable device will be described as the smart glass 100.

In a state when communication has been set up between the smart TV 30 and the smart glass 100 and when data transmission and reception between the smart TV 30 and the smart glass 100 is available (S400), the smart TV 30 may assume that the smart TV 30 is in a state of displaying channel A (S410). The smart TV 30 provides the channel information (e.g., Channel A) that is currently being displayed to the smart glass 100 (S420).

Subsequently, in case a change (e.g., a change from Channel A to Channel B) has occurred in the channel that is currently being viewed, the smart TV 30 displays the channel information corresponding to the newly changed Channel B (S430). The smart TV 30 notifies the change in the viewing channel to the smart glass 100 (S440).

After receiving the notification on the change in the viewing channel, by performing a process of determining the subject performing the channel change, as described above with reference to FIG. 6, the controller 110 of the smart glass 100 (or the smart glass controller 110) determines whether the channel change is performed by the smart glass 100 wearer (or the user wearing the smart glass 100), or whether the channel change is performed by a user other than the smart glass 100 wearer (S450). Moreover, as another optional embodiment, the controller 110 of the smart glass 100 may also provide menu information available for user interaction to the display means (101) without having to determine the subject performing the channel change. More specifically, for example, the controller 110 of the smart glass 100 provides menu information, which notifies that a change has occurred in the viewing channel of the smart TV 30 from Channel A to Channel B, on one side of the display means (101), thereby allows the user to choose (or select) whether or not to separately display the previous Channel A.

With respect to the user interaction menu information, when the smart glass 100 wearer selects to display a Channel A signal, as the user command, the controller 110 of the smart glass 100 requests for a channel signal respective to the previous Channel A to be transmitted from the smart TV 30 (S460). Subsequently, after receiving the request for channel signal transmission, the smart TV 30 transmits a Channel A signal to the smart glass 100 (S470). Then, after receiving the Channel A signal, the controller 110 of the smart glass 100 displays the received Channel A signal on the display means 101 (S490). The smart TV 30 continues to display the channel signal of the newly changed Channel B (S480). On the other hand, with respect to the user interaction menu information, if the smart glass 100 wearer (or user wearing the smart glass 100) does not select to display the Channel A signal, the controller 110 of the smart glass 100 does not perform the process step of requesting the smart TV 30 to transmit the channel signal respective to the previous Channel A.

Additionally, referring to FIG. 8, as shown in the block marked in a dotted line (S435), the smart TV 30 may optionally determine the subject performing the channel change. Herein, for example, the process of determining the subject performing the channel change, which is performed by the smart TV 30, may be performed by using a motion-detected three-dimensional (3D) camera (not shown), which recognizes the movements of users (or viewers) positioned in front of the camera, so as to determine by which one of the viewers the channel change has been performed. More specifically, for example, when a channel change signal is received immediately after detecting a specific motion or gesture of a specific viewer (or user), it may be determined that the channel change has been performed by the corresponding viewer. As shown in step S435, in case the smart TV 30 determines the subject performing the channel change, in step S450, the smart glass 100 may only provide the above-described user interaction procedure without having to perform the process of determining the subject performing the channel change.

Figure 9:
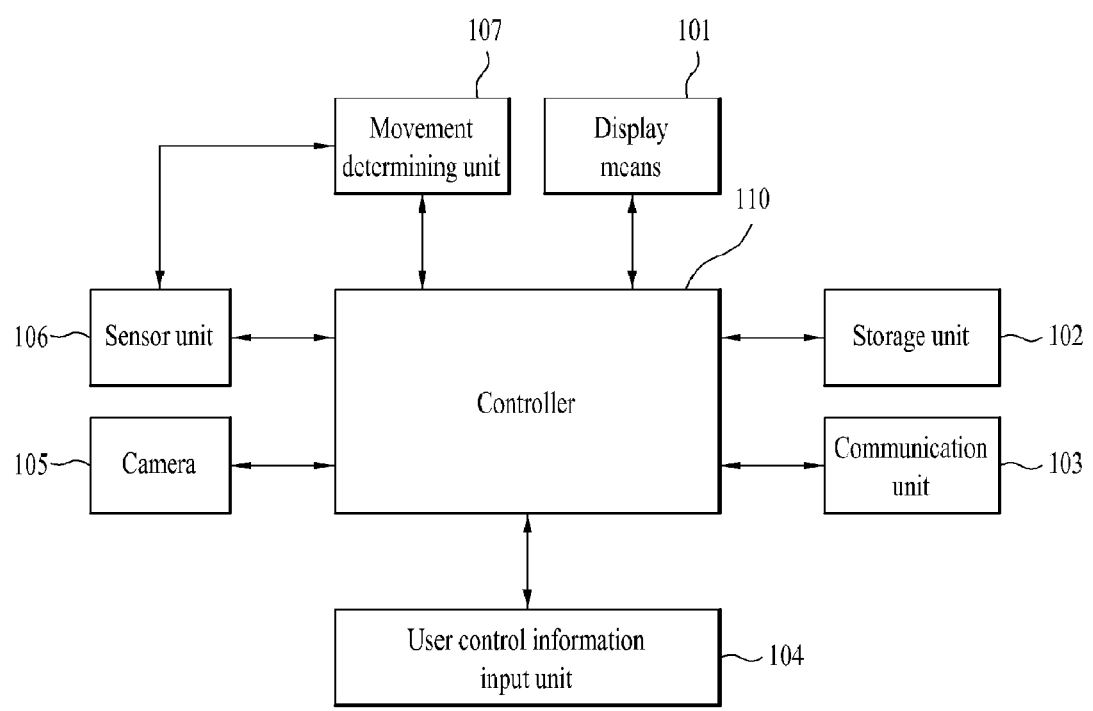
FIG. 9 illustrates a block view showing an internal structure of the wearable device adopting the present invention.

FIG. 9 illustrates a block view showing an internal structure of the wearable device adopting the present invention. For simplicity in the description, an example of the wearable device corresponding to the smart glass 100 will be given herein. Referring to FIG. 9, the smart glass 100 according to the present invention is configured to include a display means 101, a storage unit 102, a communication unit 103, a user control information input unit 104, a camera 105, a sensor unit 106, a movement determining unit 107, and a controller 110.

As a device configured to display information, the display means 101 may be realized by using diverse methods. Most particularly, based upon the different types of the wearable device, liquid crystal display (LCD), light-emitting diode (LED), and optical methods may be applied herein. Additionally, herein, the above-described user interaction menu information may be provided through the display means 101.

In addition to storing software programs required for operating (or driving) the smart glass 100, whenever required, the storage unit 102 may also temporarily store specific information. Respectively, according to the exemplary embodiment of the present invention, channel information currently being displayed on an external device may be stored in the storage unit 102, or preferred channels pre-set by the user may be stored in the storage unit 102 in advance. Herein, the storage unit 102 may also store diverse types of digital data, such as video data, audio data, still images, moving picture images, applications, and so on.

The communication unit 103 may be connected to a network via wired or wireless connection, thereby being capable of transmitting/receiving data with diverse external devices. For example, according to a partial exemplary embodiment of the present invention, the communication unit 103 may be connected to the above-described external display device 30 via wireless communication, so as to transmit/receive necessary information. Additionally, the smart glass 100 may use the communication unit 103, so as to perform pairing and communication access with a neighboring digital device, and the smart glass 100 may also transmit/receive data to/from the accessed (or connected) digital device. Meanwhile, the communication unit 103 may include multiple antennae. The smart glass 100 may use the multiple antennae, so as to directly receive broadcast signals from an external source. Additionally, the smart glass 100 may use the multiple antennae, so as to detect a position status of the digital device, which is connected to the smart glass 100 via communication access (or connection). More specifically, by using time difference, phase difference, and so on, of the signals each being transmitted/received through the multiple antennae provided in the smart glass 100, a position relation between the smart glass 100 and the digital device connected thereto may be detected.

The user control information input unit 104 refers to a means configured to receive a user control command, which controls the usage of the smart glass 100. The user control command may include a user configuration command. For example, with respect to the exemplary embodiment of the present invention, the wearer 10 of the smart glass 100 (or user 10 wearing the smart glass 100) may pre-set preferred channels through the user control information input unit 104. And, herein, settings may be made so that operations of FIG. 5 to FIG. 8 can be performed only in a case when the channel currently being displayed corresponds to the preferred channel. Additionally, the wearer 10 of the smart glass 100 may also perform initial settings of the channel displaying method through the user control information input unit 104. For example, as shown in FIG. 7, when it is determined that the channel change is not performed by the viewer 10 wearing the smart glass 100, settings may be made so that the previous channel information can be automatically displayed on the display means 101. Moreover, as shown in FIG. 8, when it is determined that the channel change is not performed by the viewer 10 wearing the smart glass 100, settings may also be made, so that user interaction menu information can first be provided, and, then, whether or not to display the previous channel information can be decided in accordance with a user command respective to the provided user interaction information. Herein, user command respective to the user interaction menu information may be provided through the user control information input unit 104.

The camera 105 is configured to be used for recognizing objects located in front of the smart glass 100 and capturing images (or taking pictures) of the recognized objects. The sensor unit 106 is configured to perform a function of detecting movement in neighboring objects of the smart glass 100. Herein, the sensor unit 106 may be configured of multiple sensing modules, for example, each consisting of at least one sensing means, such as a gravity sensor, a geomagnetic (or terrestrial magnetism) sensor, a motion sensor, a gyroscope sensor, an acceleration sensor, an infrared sensor, an inclination sensor, a brightness sensor, an altitude sensor, an odor sensor, a temperature sensor (or thermal sensor), a depth sensor, a pressure sensor, a banding sensor, an audio sensor, a video sensor, a Global Positioning System (GPS) sensor, a touch sensor, and so on. Nevertheless, the present invention will not be limited only to the sensing means presented above. For example, according to the exemplary embodiment of the present invention, in order to determine the subject performing the channel change, it may be sufficient to have the sensor unit 106 detect a motion or gesture of the wearer 10 of the smart glass 100 and provide the detected result.

The movement determining unit 107 receives the sensing detection result of the sensor unit 106. Thereafter, upon comparison with a predetermined reference value, if the detected result is greater than the reference value by a specific size, the movement determining unit 107 may determine that a significant movement has been detected. Additionally, even in case the detected result is recognized as a specific gesture (e.g., a motion of picking up an object, and so on), the movement determining unit 107 may also determine that a significant movement has been detected. The determined result of the movement determining unit 107 may be provided to the controller 110 so as to be used as a basis of the final determination.

As a main controller of the smart glass 100, in addition to controlling each element 101 to 107 configuring the above-described smart glass 100, the controller 110 also controls information between each element and controls data transmission/reception. Respectively, as described above, the operation processes shown in FIG. 5 to FIG. 6 according to exemplary embodiment of the present invention may be realized based upon the functions of the controller 110. For example, in determining the subject performing the channel change, the controller 110 may determine the subject having performed the channel change based upon all of a sensing result detected from the sensor unit 106, a movement determining result provided from the movement determining unit 107, and a channel change signal received from the external device 30 through the communication unit 103.

Meanwhile, the block view showing the internal structure of the smart glass 100 shown in FIG. 9 should be understood as an example given for convenience of description. Therefore, in the actual design of the smart glass 100, each element shown in FIG. 9 may be configured as a single integrated block or may be separately configured only of multiple required blocks. For example, the movement determining unit 107 has been illustrates as a separate element only for the convenience in the description of the present invention. And, therefore, it will be apparent that, when realizing the actual product, the movement determining unit 107 can be configured as a single processor along with the controller 110.

As described above, the wearable device and the method for controlling display of the same according to the exemplary embodiment of the present invention have the following advantages. According to an exemplary embodiment of the present invention, when a third party user other than the user wearing the wearable device attempts to change the viewing channel, the information on the previous channel continues to be displayed to the wearer of the wearable device (or viewer wearing the wearable device). Accordingly, the viewer wearing the wearable device may continue to be provided with the information he (or she) wishes. According to another exemplary embodiment of the present invention, when a third party user other than the user wearing the wearable device attempts to change the viewing channel, by providing a user selectable menu information to the viewer wearing the wearable device, the viewer wearing the wearable device may be capable of selecting a wanted (or desired) menu. Thus, according to the exemplary embodiment of the present invention, the user convenience for the user (or viewer) wearing the wearable device may be enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a wearable device including a display, the method comprising:
displaying a first content on an external device such that a first person and a second person simultaneously view the first content displayed on the external device, wherein the first person wears the wearable device;
changing a content currently displayed on the external device from the first content to a second content different from the first content, while the first content is simultaneously viewed by the first and second persons;
determining, via a controller, whether the changing the content is performed by the first person; and
displaying the first content on the display of the wearable device to be viewed by the first person if it is determined that the changing the content is performed by the second person,
wherein during the displaying the first content on the display, the first content is displayed only on the display of the wearable device.

2. The method of claim 1, wherein the determining comprises:
detecting a specific motion or gesture of the first person;
verifying whether a content change signal is received; and
if the content change signal is received after detecting the specific motion or gesture, determining the changing the content is performed by the first person.

3. The method of claim 2, wherein the detecting comprises detecting a movement in a body and an arm of the first person which is equal to or greater than a predetermined movement.

4. The method of claim 1, wherein the displaying the first content includes requesting the external device or a network to send the first content to the wearable device.

5. The method of claim 4, further comprising:
if it is determined that the changing the content is performed by the first person, not displaying the first content at the display of the wearable device in order for the first person to view the second content on the external device.

6. The method of claim 1, wherein the second person does not wear the wearable device, and
wherein during the displaying the first content on the display of the wearable device, the second content is displayed only on the external device.

7. A wearable device, comprising:
a communication unit configured to communicate with an external device, the communication unit being configured to receive a content from an external device;
a display configured to electronically represent the received content as an image on a screen thereof; and
a controller configured to control the communication unit and the display,
wherein when the content displayed on the external device is changed from a first content to a second content different from the first content by a second person other than a first person wearing the wearable device while the first content is displayed on the external device such that the first and second persons simultaneously view the first content displayed on the external device, the controller controls the display to display the first content to be viewed by the first person, and
wherein the first content is displayed only on the display of the wearable device.

8. The wearable device of claim 7, further comprising:
a sensor unit configured to detect a motion or gesture of the first person.

9. The wearable device of claim 8, wherein, the controller is configured to detect a specific motion or gesture of the first person using the sensor unit, and if a content change signal is received after detecting the specific motion or gesture, determine the content displayed at the external device is changed from the first content to the second content by the first person.

10. The wearable device of claim 9, wherein the controller is configured to detect a movement in a body and an arm of the first person which is equal to or greater than a predetermined movement in order to detect the specific motion or gesture.

11. The wearable device of claim 7, wherein before displaying the first content, the controller controls the communication unit to request the external device or a network to send the first content to the wearable device.

12. The wearable device of claim 11, wherein if the content displayed at the external device is changed from the first content to the second content by the first person, the controller controls the display not to display the first content in order for the first person to view the second content on the external device.

13. The wearable device of claim 7, wherein the wearable device comprises a smart glass type device.

14. The wearable device of claim 7, wherein the wearable device comprises a smart watch type device.

15. The wearable device of claim 7, wherein the wearable device comprises a smart lens type device.

16. A method for controlling a wearable device including a display, the method comprising:
displaying a first content on an external device such that a first person and a second person simultaneously view the first content displayed on the external device, wherein the first person wears the wearable device;
changing a content currently displayed on the external device from the first content to a second content different from the first content, while the first content is simultaneously viewed by the first and second persons;
after the changing the content at the external device, displaying on the display of the wearable device a menu allowing the first person to select whether the first content is displayed on the display; and
if the first person selects to display the first content on the display using the menu, displaying the first content on the display to be viewed by the first person,
wherein during the displaying the first content on the display, the first content is displayed only on the display of the wearable device.

17. The method of claim 16, further comprising:
determining whether the changing content is performed by the first person,
wherein the menu is displayed on the display if it is determined that the changing content is performed by the second person.

18. The method of claim 17, wherein the determining comprises:
detecting a specific motion or gesture of the first person;
verifying whether a content change signal is received; and
if the content change signal is received after detecting the specific motion or gesture, determining the changing the content is performed by the first person.

19. The method of claim 18, wherein the detecting comprises detecting a movement in a body and an arm of the first person which is equal to or greater than a predetermined movement.

* * * * *